Patented Aug. 30, 1949

2,480,110

UNITED STATES PATENT OFFICE 2,480,110

BENZANTHRONE-THIOPHANTHRAQUINONE ACRIDINES

Clarence F. Belcher, Bridgeton, N. J., and Lorraine A. Mero, Wilmington, Del., assignors to E. I. du Pont de Nemours & Company, Wilmington, Del., a corporation of Delaware No Drawing. Application November 15, 1947, Serial No. 786,336

4 Claims. (Cl. 260—274)

This invention relates to the preparation of new vat dyes of the anthraquinone series. The invention relates more particularly to the preparation of vat dyes which are alkali fusion products of benzanthronyl - aminothiophanthraquinone compounds. As in the case of the alkali fusion of the benzanthronyl - aminoanthraquinones, where it has never been proved with absolute certainty that the ring closure takes place only to form the acridine ring, so also in the ring closure of the compounds of the present invention, while the chemical constitution has not been proved beyond question, these compounds are generally considered as having, and will be represented by, the following structural formula, which is analogous to the formula generally accepted in the alkali fusion of the benzanthronyl-aminoanthraquinones:

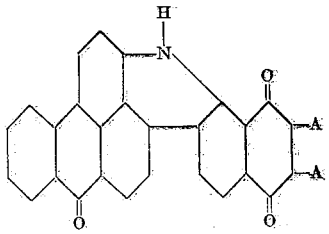

in which AA is a thiophene ring of the formula:

These dyes are therefore considered to be benzanthronyl - aminothiophanthraquinone acridines comparable to the benzanthronyl-aminoanthraquinone acridines of literature but which carry in the vattable nucleus a thiophene ring. They dissolve in concentrated sulfuric acid to give green solutions, and dye cellulose fibers from an alkaline hydrosulfite or sodium sulfide vat in olive green to gray shades of exceptionally good fastness properties.

It is therefore an object of this invention to produce new vat dyes of the benzanthronyl-aminothiophanthraquinone acridine type which are outstanding in fastness properties and depth of shade.

The dyestuffs of this invention are prepared by alkali-fusion of the benzanthronylaminothiophanthraquinone compounds by treatment with alkaline condensing agents, generally using an alcoholic medium. Fusion may be carried out under a wide variety of reaction conditions as to temperature and time, depending upon the reactants employed. A temperature range of 140° to 165° C. in general gives most satisfactory results, although temperatures outside of this range are occasionally necessary. The time of reaction depends upon the temperature chosen and the reactants used.

The benzanthronyl - aminothiophanthraquinones, which may be fused with caustic alkalies to produce the acridine derivatives of this invention, are those more particularly disclosed and claimed in our co-pending application Serial No. 786,335, now Patent 2,480,109, filed concurrently herewith and which have the general formula:

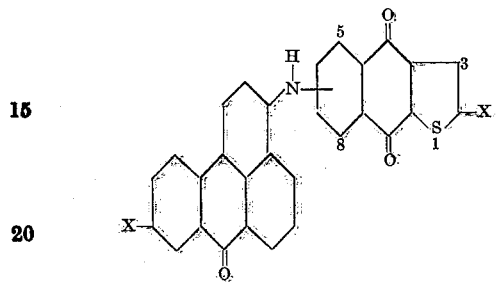

wherein the thiophanthraquinonyl radical is attached to the —N— in the 5- or 8-position and X in each case is hydrogen or halogen. These compounds may be prepared by condensing one mol of a 5- or 8-aminothiophanthraquinone with a mono- or dihalogen benzanthrone (preferably the bromo-benzanthrone) by the condensation methods ordinarily used in condensing aminoanthraquinone with halogen anthraquinone.

The following examples are given to illustrate the preparation of these new dyes. The parts used are by weight, unless otherwise specified.

Example 1

A mixture of 38 parts of methanol and 75 parts of potassium hydroxide is stirred at 125°–130° C. until smooth, then 19 parts of 5-[Bz-1-benzanthronylamino]-thiophanthraquinone are added at 130°–135° C. The charge is stirred at 145° ± 2° C. for one hour, diluted with water and poured into one liter of cold water. The slurry is stirred several hours at room temperature, filtered and the cake is washed alkali-free with water and dried. The 5-[Bz-1-benzanthronylamino]-thiophanthraquinone acridine may be represented by the formula:

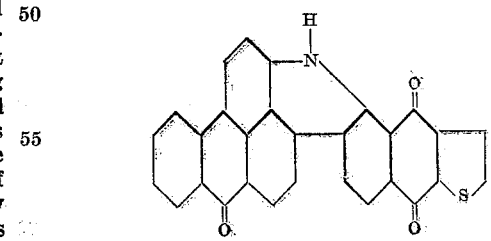

It dissolves in a concentrated sulfuric acid to give a green colored solution, and dyes vegetable fibers from bluish-green alkaline-hydrosulfite or sodium sulfide vats in greenish-olive shades of outstanding light fastness.

*Example 2*

A mixture of 38 parts of methanol and 75 parts of potassium hydroxide is stirred at 130° C. until smooth, then 15 parts of 5-[6-bromo-Bz-1-benzanthronylamino]-thiophanthraquinone are added at 130°–135° C. The charge is heated at 145° ± 2° C. for one hour, diluted with water and drowned in 900 parts of cold water. The slurry is stirred for several hours at room temperature, filtered and the cake washed alkali-free with water and dried. The compound is generally considered to be a 5-[Bz-1-benzanthronylamino]-thiophanthraquinone acridine of the formula:

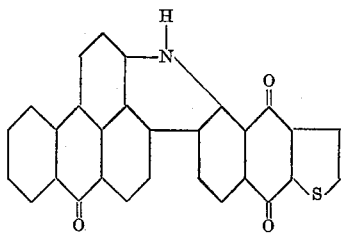

in which bromine is largely lost during the fusion and it is not known whether the 6-position enters into any other reaction or not. The product, which is acid pasted by customary methods, gives a green solution in concentrated sulfuric acid, and dyes vegetable fibers gray shades of outstanding light fastness from a green alkaline-hydrosulfite vat, or a bluish-green sodium sulfite vat.

In similar fashion, 6,Bz-1-dibromobenzanthrone may be condensed with 8-aminothiophanthraquinone and the resulting anthrimide fused under alkaline conditions.

*Example 3*

To 22 parts of methanol are added 43.5 parts of potassium hydroxide gradually, while heating slowly to 125°–130° C. When the melt is smooth, 11 parts of 8-[Bz-1-benzanthronylamino]-thiophanthraquinone are added slowly at 130°–135° C. The charge is heated for one hour at 145°±2° C., diluted with water, and drowned in 550 parts of cold water. The slurry is stirred several hours at room temperature, filtered, and the cake is washed with water and dried. The 8-[Bz - 1 - benzanthronylamino] - thiophanthraquinone acridine may be represented by the formula:

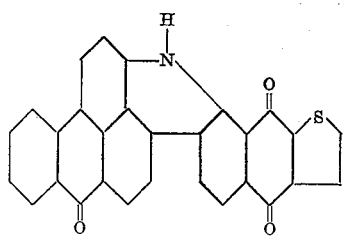

It dyes vegetable fibers from a greenish alkaline-hydrosulfite vat in olive-green shades of outstanding light fastness.

Other halogen-containing benzanthronylaminothiophanthraquinones may be subjected to the caustic alkali fusions, as illustrated in the above examples, to give dyes of similar dyeing characteristics and fastness properties, such as the condensation products of 2-chloro-5-aminothiophanthraquinone or 2-bromo-5-aminothiophanthraquinone with Bz-1-bromobenzanthrone or Bz-1-chlorobenzanthrone; one mol of 8-aminothiophanthraquinone with one mol of 6,Bz-1-dichlorobenzanthrone; 2-chloro-5-aminothiophanthraquinone or 2-bromo-5-aminothiophanthraquinone with 6,Bz-1-dibromobenzanthrone or 6,Bz-1-dichlorobenzanthrone; 2-chloro-8-aminothiophanthraquinone or 2-bromo-8-aminothiophanthraquinone with 6,Bz-1-dibromobenzanthrone, or 6,Bz-1-dichlorobenzanthrone.

During a caustic alkali fusion of the benzanthronylaminothiophanthraquinones which carry halogen in the molecule, particularly in the 2-position of the thiophene ring or the 6-position of the benzanthrone nucleus, such halogen is largely lost and it has been impossible to determine whether or not during the fusion the position in the molecule where the halogen is eliminated also enters into the reaction. The alkali fusion products of the halogen substituted compounds show dyeing properties similar to those which do not contain halogen substituents in the molecule, and exhibit the same good light fastness and depth of shade.

The dyes of this invention all show a very marked improvement in depth of shade and an unexpected increase in light fastness over their anthraquinone analogs, which is especially surprising since the benzanthronylamino-anthraquinone acridines are considered to exhibit outstanding light fastness and a further improvement would not be expected nor could it be predicted on the basis of other known dyestuffs containing sulfur. It has also been found that these new colors are more easily vattable and that they are therefore excellent printing colors which build up to deeper shades than can normally be achieved with analogous anthraquinone colors. Since these colors are readily vattable with sodium sulfide, they can be applied in the same manner as the sulfur colors and are therefore valuable additions in that particular field of vat dyes, giving colors of fastness properties not heretofore available in that class.

We claim:

1. The vat dyes obtained by the caustic alkali condensation of the benzanthronylaminothiophanthraquinones of the formula:

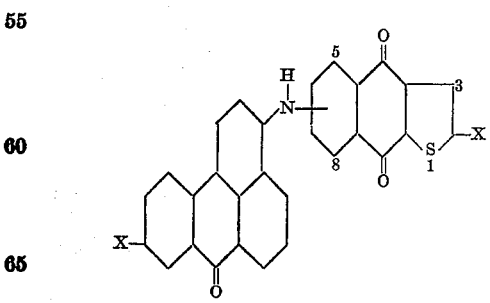

wherein the thiophanthraquinonyl radical is attached to the —N— in one of the positions 5 and 8, and wherein X in each case stands for an atom of the group consisting of hydrogen and halogen, which condensation products dye cotton from an alkaline hydrosulfite vat in greenish-olive and gray shades.

2. The vat dye obtained by the caustic alkali condensation of the benzanthronylaminothiophanthraquinone of the formula:

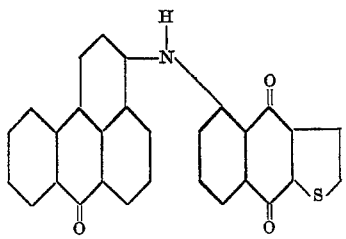

which condensation product dyes cotton from an alkaline hydrosulfite vat in greenish-olive shades.

3. The vat dye obtained by the caustic alkali condensation of the benzanthronylaminothiophanthraquinone of the formula:

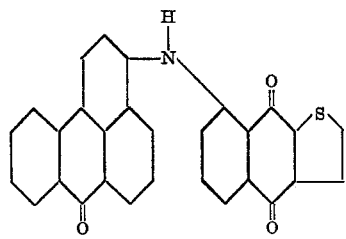

which condensation product dyes cotton from an alkaline hydrosulfite vat in greenish-olive shades.

4. The vat dye obtained by the caustic alkali condensation of the benzanthronylaminothiophanthraquinone of the formula:

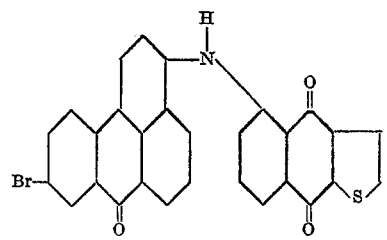

which condensation product dyes cotton from an alkaline hydrosulfite vat in gray shades.

CLARENCE F. BELCHER.
LORRAINE A. MERO.

REFERENCES CITED

The following references are of record in the file of this patent:

UNITED STATES PATENTS

| Number | Name | Date |
|---|---|---|
| 2,212,029 | Lulek | Aug. 20, 1940 |

OTHER REFERENCES

Fieser et al., "Organic Chemistry" (D. C. Heath; Boston; 1944), page 527.